(12) United States Patent  
Woods

(10) Patent No.: US 8,739,818 B1  
(45) Date of Patent: Jun. 3, 2014

(54) CONTROL VALVE WITH SINGLE SET OF ORIFICES

(75) Inventor: John B. Woods, Broken Arrow, OK (US)

(73) Assignee: Living Trust of John B. Woods and Nola Fae Woods, Broken Arrow, OK (US), dated March 5, 1999

( * ) Notice: Subject to any disclaimer, the term of this patent is extended or adjusted under 35 U.S.C. 154(b) by 520 days.

(21) Appl. No.: 12/848,498

(22) Filed: Aug. 2, 2010

(51) Int. Cl.  
*F16K 51/00* (2006.01)

(52) U.S. Cl.  
USPC .................................. 137/454.6; 137/625.31

(58) Field of Classification Search  
USPC ................... 137/454.6, 316, 625.31; 251/208  
See application file for complete search history.

(56) References Cited

U.S. PATENT DOCUMENTS

| | | | | |
|---|---|---|---|---|
| 3,780,758 A | * | 12/1973 | DeVries | 137/454.6 |
| 4,098,294 A | | 7/1978 | Woods | |
| 4,821,765 A | * | 4/1989 | Iqbal et al. | 137/270 |
| 4,922,950 A | * | 5/1990 | Taylor | 137/316 |
| 4,924,903 A | * | 5/1990 | Orlandi | 137/454.5 |
| 4,966,186 A | * | 10/1990 | Rodstein | 137/454.5 |
| 4,967,787 A | * | 11/1990 | Taylor | 137/316 |
| 5,020,568 A | * | 6/1991 | Taylor | 137/316 |
| 5,217,046 A | | 6/1993 | Woods | |
| 5,365,978 A | | 11/1994 | Woods | |
| 7,607,639 B2 | * | 10/2009 | Chen et al. | 251/208 |

\* cited by examiner

*Primary Examiner* — John Rivell  
*Assistant Examiner* — R. K. Arundale  
(74) *Attorney, Agent, or Firm* — Molly D. McKay

(57) ABSTRACT

A flow control valve having a body with an inlet port, an outlet port and an access opening. The body has a cavity connecting with the access opening and communicating between the inlet and outlet ports. A single pair of discs with orifices is located within the cavity. One disc is secured to the bonnet which extends into the cavity and the other is attached to a rotatable turning fork which rotates to change the alignment of the disc orifices thereby controlling flow to the outlet port. The bonnet and the turning fork have openings which allow fluid to flow from the inlet port to the discs. The bonnet attaches over the access opening and secures the turning fork, the discs, a wear insert and a lower seat within the cavity. An o-ring holds the valve assembly together as it is installed and removed from the valve body.

15 Claims, 4 Drawing Sheets

CONTROL VALVE WITH SINGLE SET OF ORIFICES

BACKGROUND OF THE INVENTION

1. Field of the Invention

The present invention is a control valve with a single set of orifices that are formed from a single pair of discs. The design of the present valve's internal components are easier and less expensive to make, easier to insert into and remove from the valve body, and can be used to retrofit into existing valve bodies to replace more complicated and expensive components.

2. Description of the Related Art

The prior art is represented by three of the present inventor's previously invented valves. The first previous valve by the present inventor was the Woods in-line flow-control choke valve which was marketed by Woods Energy Products, Inc. in Tulsa, Okla. This valve was a straight through valve with double sets of double discs and two orifices. The problem with this valve was that it was hard to put actuators on it.

The second previous valve by the present inventor was the valve taught in U.S. Pat. No. 5,217,046 entitled Top Entry Flow Control Valve with Two Sets of Orifices, and the third previous valve by the present inventor was the valve taught in U.S. Pat. No. 5,365,978 and was also entitled Top Entry Flow Control Valve with Two Sets of Orifices. The present invention is an improvement over the inventor's third previous valve which is shown in FIG. 1.

Referring now to FIG. 1, the third previous valve 10A has several problems. The first problem with the third previous valve 10A is that it is difficult to manufacture. Specifically, the inside of the body 12A of the valve must be machined to receive pins 154 that hold the internal components of the valve 10A within the valve body 12A. Also, the wear sleeve 218 that receives the opposite ends of the pins 154 has to be machined to receive those pins 154. Additionally, the third previous valve 10A required intricate machining of engaging flanges 166 and 200 as a means of linking the wear sleeve 218 to the rotatable cylinder 20A in order to remove both the rotatable cylinder 20A and the wear sleeve 218 from the valve body 12A in order to replace the discs 16 and 18 and the wear insert 144. Because of the degree of difficulty in manufacturing the third previous valve 10A, it is costly to make.

Still another problem with the third previous valve 10A is that it is difficult to assemble and to disassemble for servicing. In order to insert the internal components of the valve 10A into the valve body 12A, the pins 154 had to be properly aligned with the machined openings in the valve body 12A so that the pins can be pressed in. This is not an easy task. When the internal components of the valve 10A are removed from the valve body 12A, the pins 154 may or may not be also be removed with the internal components. Also, in order to insert or remove the internal components, the flanges 166 and 200 must be turned in such an orientation so that they engage each other to thereby link the internal components together as a unit.

The present invention addresses these problems by providing a control valve with a single set of orifices that are formed from a single pair of discs. The design of the present valve's internal components are easier and less expensive to make, easier to insert into and remove from the valve body, and the internal components can be used to retrofit into existing valve bodies to replace more complicated and expensive components.

SUMMARY OF THE INVENTION

The present invention is a top entry flow control valve having a body with an inlet port, an outlet port and an access opening. The body has a cavity connected with the access opening and communicating with the inlet port and outlet port to allow fluid flow through the valve body. A single pair of discs with orifices is positioned within the cavity to control flow into the outlet port by rotating one of the discs to change the degree of alignment between the disc orifices. One disc is secured to the bonnet of the valve which extends into the cavity and the other disc is attached to a distal end of a rotatable turning fork which also extends into the cavity. Both the bonnet and the turning fork have openings therein so that fluid can freely flow from the inlet port to the discs. By rotating the turning fork, the alignment of the orifices of the two discs is changed to control flow through the valve. The bonnet is removably attached over the access opening and secures the turning fork, the discs, a hollow wear insert and a lower seat within the cavity. A handle is attached to the turning fork by means of a manual adaptor cap as a means of manually changing the alignment of the discs. O-rings are provided to seal between the various valve components and to provide sufficient friction to hold the valve components together as they are installed in and removed from the valve body for service.

DETAILED DESCRIPTION OF THE PREFERRED EMBODIMENT

Figure 2:
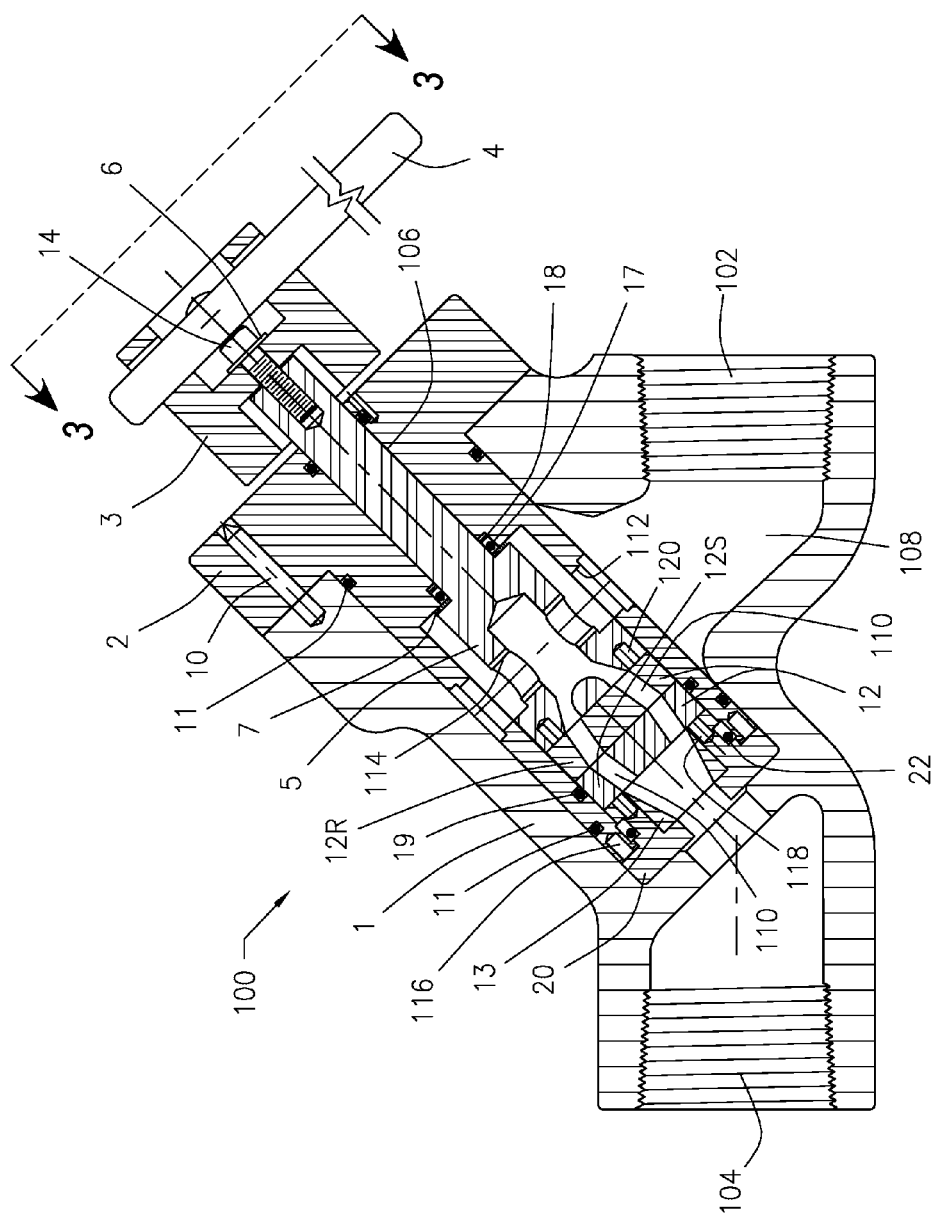
FIG. 2 is a cross sectional view of a control valve with a single set of orifices constructed in accordance with a preferred embodiment of the present invention.
Figure 3:
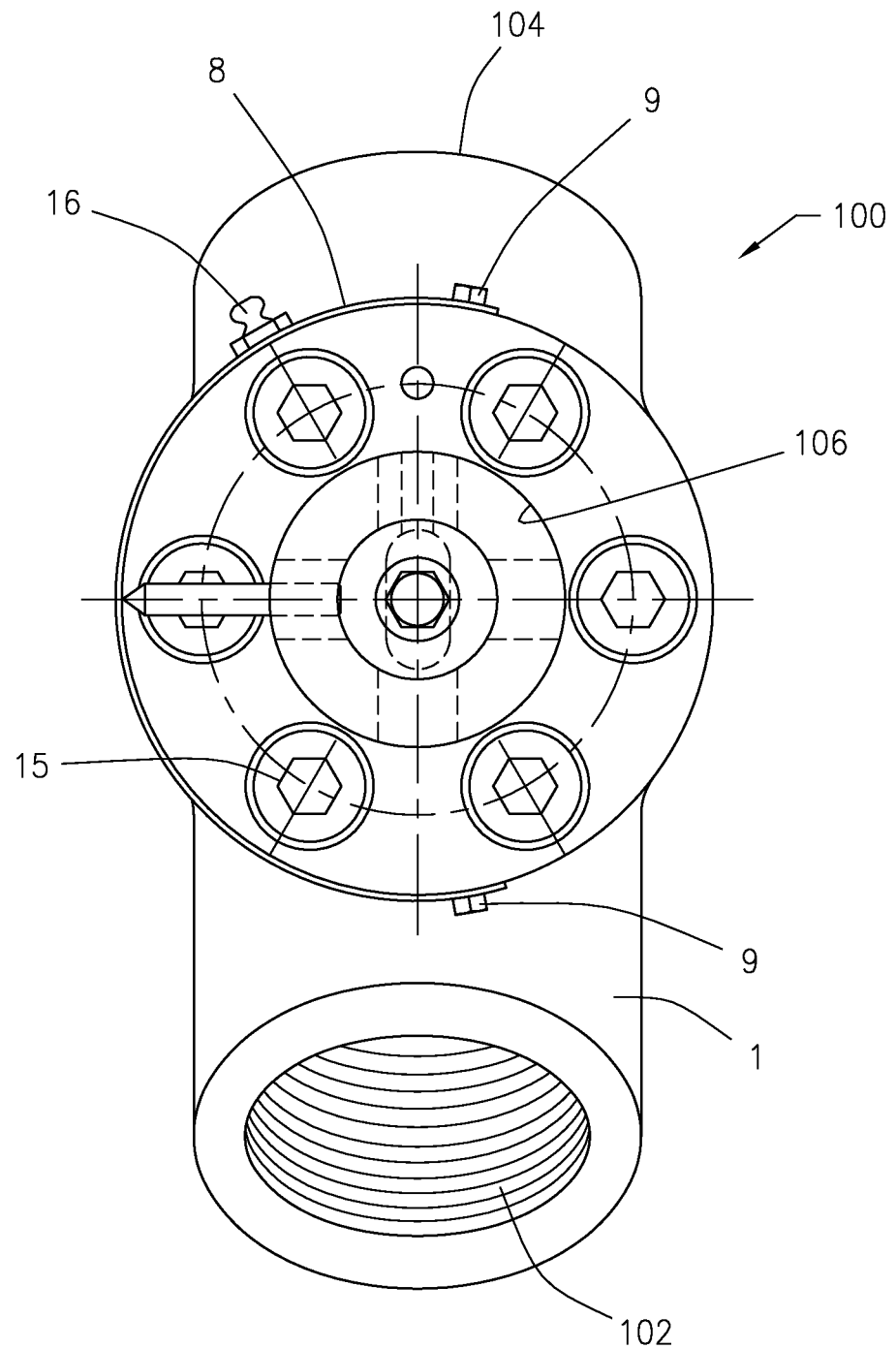
FIG. 3 is a top view of the control valve taken along line 3-3 of FIG. 2.

Referring now to FIGS. 2 and 3, there is illustrated a top entry flow control valve 100 or choke valve having a body 1 with an inlet port 102, an outlet port 104 and an access opening 106. The body 1 has a cavity 108 connected with the access opening 106 and communicating with the inlet port 102 and outlet port 104 to allow fluid flow through the valve body 1.

A single pair of discs 12 consisting of a rotatable disc 12R and a stationary disc 12S is positioned within the cavity 108. Each disc 12R and 12S has orifices 110 extending there through. Flow into the outlet port 104 is controlled by rotating the rotatable disc 12R relative to the stationary disc 12S to change the degree of alignment between the disc orifices 110. The stationary disc 12S is secured to the bonnet 2 of the valve 100 which extends into the cavity 108 and the rotatable disc 12R is attached to one end of a rotatable turning fork 5 which also extends into the cavity 108. Both the bonnet 2 and the turning fork 5 are provided with openings 112 and 114, respectively, so that fluid can freely flow from the inlet port 102 to the discs 12. By rotating the turning fork 5, the alignment of the orifices 110 of the two discs 12R and 12S is changed to control flow through the valve 100.

Referring to FIG. 3, an indicator band 8 can be fastened to the bonnet 2 via machine screws 9. The indicator band 8 is provided with indicating marks that can be aligned with the indicator assembly pin 10 provided on the handle or manual adaptor cap 3 or alternately on the bonnet 2 to provide a visual indication of the relative alignment of the discs 12R and 12S.

The bonnet 2 is removably attached over the access opening 106 and secures within cavity 108 the turning fork 5, the discs 12R and 12S, a hollow wear insert 13, and a lower seat 20. The wear insert 13 is preferably formed of a hard metal such as tungsten carbide which is resistant to erosion due to cavitation created as the fluid flows out of the orifices 110 in disc 12S. The lower seat 20 is provided with a seat opening 21 that communicates with the outlet port 104 provided in the body 1.

A handle 4 is attached by means of a manual adaptor cap 3 to an opposite end of the turning fork 5 which extends out of the body 1 through the access opening 106. The combined handle 4 and manual adaptor cap 3 secure to the turning fork 5 by means of a hex head cap screw 14 and split lock washer 6. The handle 4 serves as a means of manually changing the alignment of the discs 12R and 12S by rotating the turning fork 5 and thereby also rotating the attached rotatable disc 12R relative to the stationary disc 12S.

As shown in FIG. 2, pins 116 secure the bonnet 2 to the lower seat 20, and pins 118 secure the stationary disc 12S to the lower seat 20. Also, pins 120 secure the rotatable disc 12R to the turning fork 5.

O-rings 11, 17, 19 etc. are provided as needed to pressure seal between the various valve components. Additionally, a thrust bearing 7 and a Teflon back up ring 18 are provided between the turning fork 5 and the bonnet 2 in association with o-ring 17.

Figure 4:
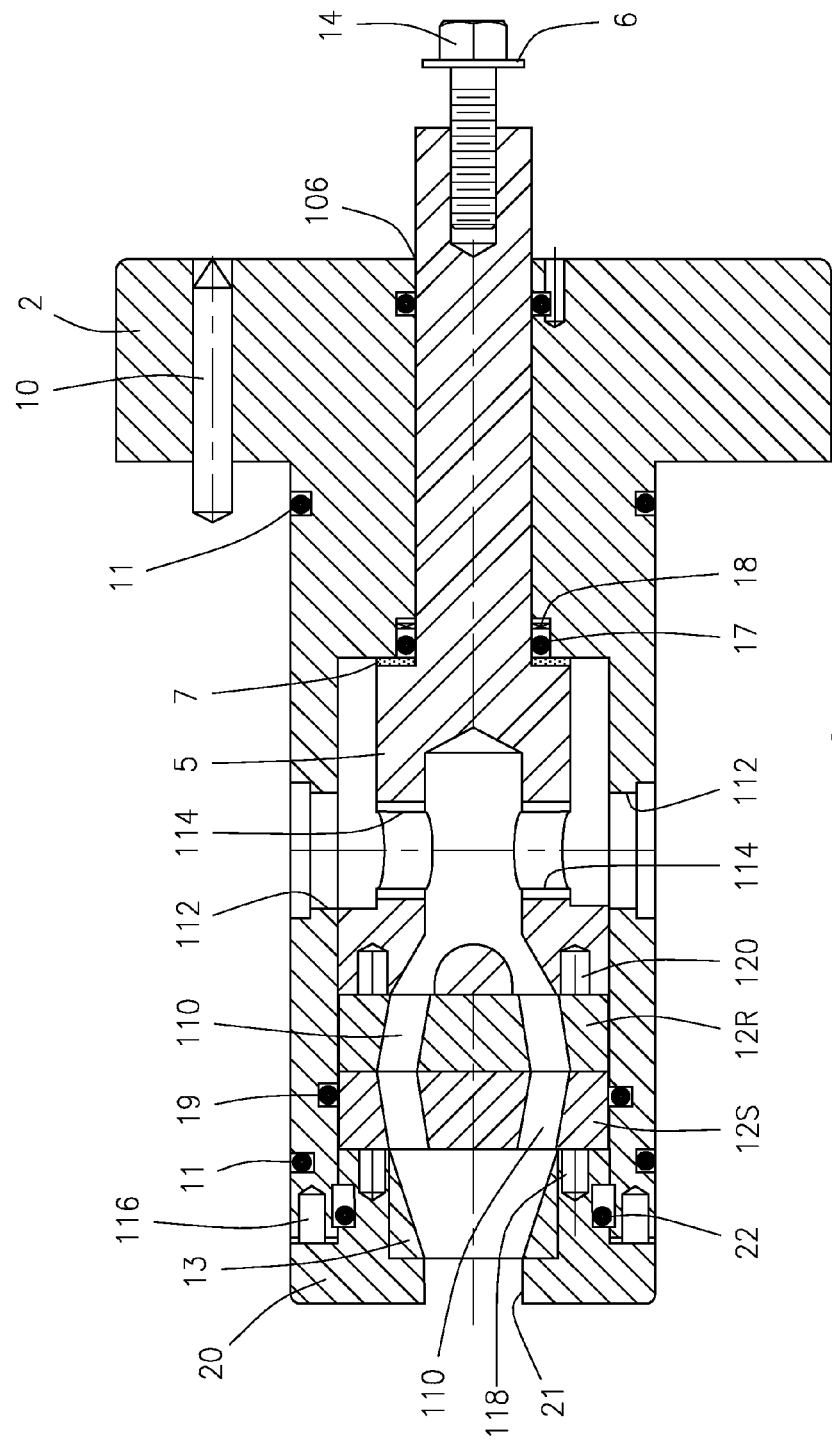
FIG. 4 is an enlarged view of the valve assembly of FIG. 2 that inserts into the body of the control valve shown with the handle and manual adaptor cap removed from the valve assembly for clarity.

O-ring 22 located between the bonnet 2 and the lower seat 20 is provided solely to supply sufficient friction to hold the valve assembly together as it is installed in the valve body 1 and is removed from the valve body 1 for service. Specifically the valve assembly, which is partially illustrated in FIG. 4, consists of components that are held together by friction supplied by o-ring 22 and are of two unitary sets. The first unitary set of valve components consists of the pinned together bonnet 2, lower seat 20 and stationary disc 12S. The second unitary set of valve components consist of the pinned together rotating disc 12R and turning fork 5, and although not illustrated in FIG. 4, also include the bolted on handle 4 and manual adapter cap 3. Although o-ring 22 is illustrated as the means for holding the valve components together as they are installed in or removed from the valve body 1, the invention is not so limited and screws, pins or other suitable fastening means (not illustrated) can be used for this purpose. A grease fitting 16 is provided on the bonnet 2 to provide means for adding grease to the access opening 106 between the rotatable turning fork 5 and the stationary bonnet 2.

Figure 1:
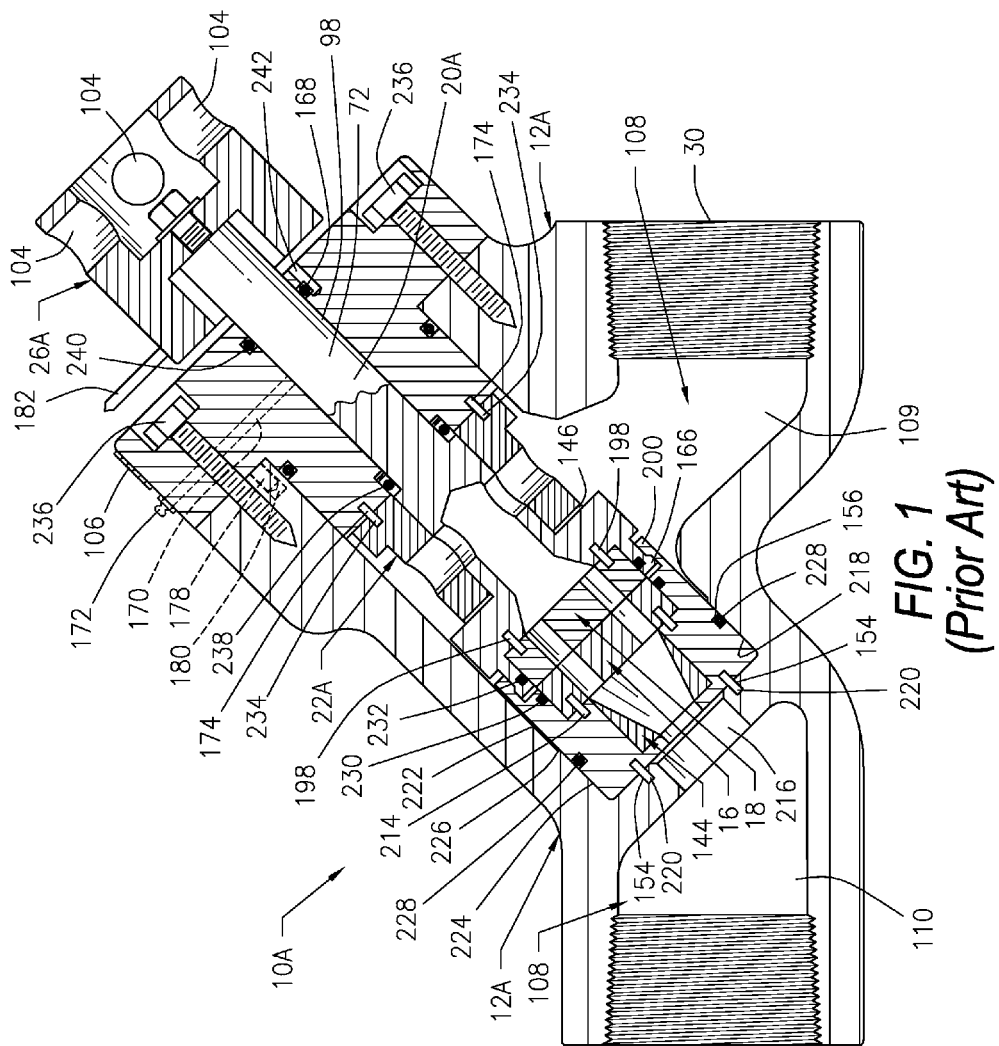
FIG. 1 is a cross sectional view of a prior art valve.

As is evident from a comparison of the body 12A of the prior art valve 10A shown in FIG. 1 with the body 1 of the present valve 100 from FIG. 2, the bodies 12A and 1 are essentially identically. Thus the valve assembly of the present valve 100 is interchangeable with the corresponding valve components of the prior art valve 10A. This means that the valve assembly of the present valve 100 can be used as replacements for those corresponding components associated with the prior art valve body 12A as a means of retrofitting an existing prior art valve 10A with the less expensive and more easily serviceable valve assembly of the present invention.

Thus, in the present valve 100, the valve assembly is only attached to the valve body 2 by means of the Allen head tap screws 15 that secure the bonnet 2 to the valve body 1, and the present invention 100 does not require the valve body 2 to be machined to receive pins. The stationary disc 12S is secured by pins 116 and 118 to the lower seat 20 and bonnet 2 whereas the rotatable disc 12R is pinned to the turning fork 5 such that the rotatable disc 12R rotates relative to the stationary disc 12S whenever the handle 4 to which the turning fork 5 is attached turns relative to the bonnet 2.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A flow control valve with single set of orifices comprising:
   a top entry flow control valve having a valve body, said valve body having a smooth and straight bore cavity such that a wall of the cavity continues in a straight cylindrical configuration over the full length of the cavity, the cavity has no pin holes provided therein and has no indentations in the bore cavity wall to provide attachment of a valve assembly to the valve cavity wall, the cavity communicates between an inlet port and an outlet port, an access opening communicating with said cavity at an open end of the cavity,
   a valve assembly consisting of a single pair of discs, a single unitary valve bonnet, a turning fork and a lower seat such that the valve assembly is removably insertable into the cavity of the valve body,
   the single pair of discs provided with orifices, the single pair of discs located within the cavity between the inlet and outlet ports, a stationary disc of the pair of discs secured to the bonnet, the bonnet extends into the cavity via the access opening and secures over the open end of the cavity to seal with the valve body forming the top of the valve and preventing the stationary disc from rotating relative to the valve body, and
   a rotatable disc of the pair of discs secured to a rotatable turning fork which rotates to change the relative alignment of the disc orifices as a means to control flow to the outlet port, and
   an o-ring provided between the bonnet and the lower seat supplying sufficient friction to hold the lower seat and the bonnet together as they are pulled out of the cavity of the valve body, said o-ring supplying sufficient friction to hold the valve assembly together as the valve assembly is installed in and removed from the valve body.

2. A flow control valve with single set of orifices according to claim 1 further comprising:
   the bonnet and the turning fork each having openings providing fluid communication between the inlet port and the pair of discs.

3. A flow control valve with single set of orifices according to claim 1 further comprising:
   said bonnet attached to the valve body over the access opening such that an attachment means is located external to the cavity.

4. A flow control valve with single set of orifices according to claim 3 further comprising:
   said bonnet securing the turning fork and the pair of discs within the cavity.

5. A flow control valve with single set of orifices according to claim 4 further comprising:
   said bonnet further secures a hollow wear insert and said lower seat within the cavity, said lower seat holding said wear insert between the stationary disc and the outlet port, and said lower seat provided with a seat opening that allows flow between the stationary disc and the outlet port.

6. A flow control valve with single set of orifices according to claim 5 further comprising:

means for holding the bonnet, turning fork, pair of discs, wear insert and lower seat together as they are installed and removed from the valve body.

7. A flow control valve with single set of orifices according to claim 6 wherein the means for holding the bonnet, turning fork, pair of disc, wear insert, and lower seat together as they are installed and removed from the valve body further comprises:

at least one o-ring.

8. A flow control valve with single set of orifices according to claim 1 further comprising:

said bonnet securing to the valve body external to the cavity.

9. A flow control valve with single set of orifices according to claim 8 further comprising:

the bonnet and the turning fork each having openings providing fluid communication between the inlet port and the pair of discs.

10. A flow control valve with single set of orifices according to claim 8 further comprising:

said bonnet attached to the valve body over the access opening such that an attachment means is located external to the cavity.

11. A flow control valve with single set of orifices according to claim 10 further comprising:

said bonnet securing the turning fork and the pair of discs within the cavity.

12. A flow control valve with single set of orifices according to claim 11 further comprising:

said bonnet further secures a hollow wear insert and sail lower seat within the cavity, said lower seat holding said wear insert between the stationary disc and the outlet port, and said lower seat provided with a seat opening that allows flow between the stationary disc and the outlet port.

13. A flow control valve with single set of orifices according to claim 12 further comprising:

means for holding the bonnet, turning fork, pair of discs, wear insert and lower seat together as they are installed and removed from the valve body.

14. A flow control valve with single set of orifices according to claim 13 wherein the means for holding the bonnet, turning fork, pair of disc, wear insert, and lower seat together as they are installed and removed from the valve body further comprises:

at least one o-ring.

15. A flow control valve with single set of orifices comprising:

a top entry flow control valve having a valve body, said valve body having a straight bore cavity such that the wall of the cavity continues in a straight configuration over the full length of the cavity, the cavity communicates between an inlet port and an outlet port, an access opening communicating with said cavity on an open end of the cavity, a single pair of discs with orifices located within the cavity between the inlet and outlet ports, a stationary disc of the pair of discs secured to a single unitary bonnet which extends into the cavity via the access opening, a rotatable disc of the pair of discs secured to a rotatable turning fork which rotates to change the relative alignment of the disc orifices as a means to control flow to the outlet port, the bonnet and the turning fork each having openings providing fluid communication between the inlet port and the pair of discs, said bonnet attached to the valve body over the access opening such that an attachment means is located external to the cavity and the bonnet forms the top of the valve, and said bonnet securing the turning fork, the pair of discs, a hollow wear insert, and a lower seat within the cavity, said lower seat holding said wear insert between the stationary disc and the outlet port, and said lower seat provided with a seat opening that allows flow between the stationary disc and the outlet port, and at least one o-ring providing sufficient friction for holding the bonnet, turning fork, pair of discs, wear insert and lower seat together as they are inserted into and removed as a unitary valve assembly from the valve body.

\* \* \* \* \*